Figure 1:
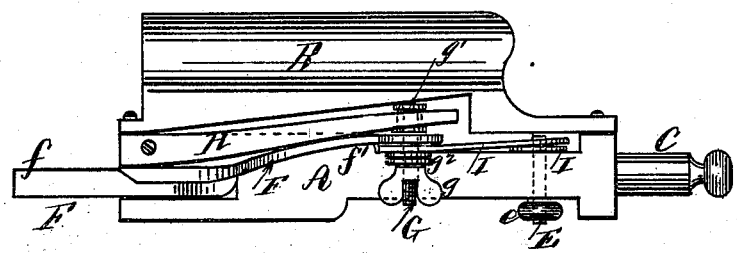
Figure 1:
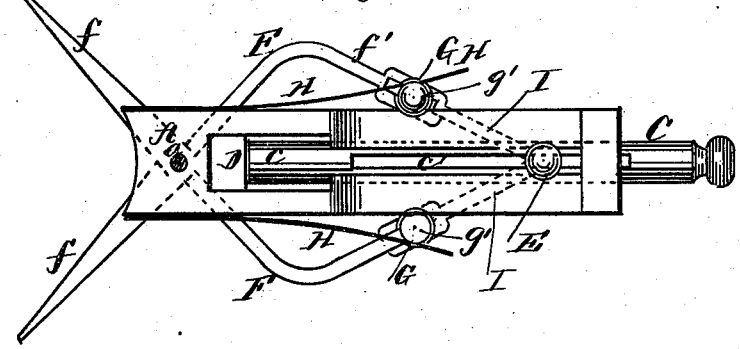
Figure 1:
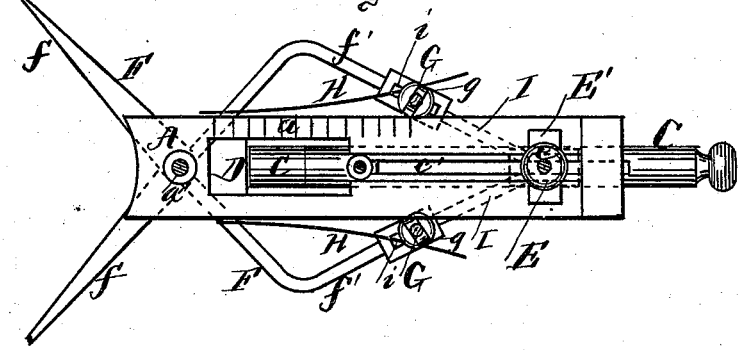

G. W. COOKE.
HATTERS' BRIM CUTTER.

No. 173,391. Patented Feb. 15, 1876.

Fig. II.

Fig. III.

Witnesses:
Franklin Barrett.
Richard Gerner.

Inventor:
George W. Cooke,
Per: Henry Gerner,
att'y.

UNITED STATES PATENT OFFICE.

GEORGE W. COOKE, OF ORANGE, NEW JERSEY.

IMPROVEMENT IN HATTERS' BRIM-CUTTERS.

Specification forming part of Letters Patent No. 173,391, dated February 15, 1876; application filed June 8, 1875.

*To all whom it may concern:*

Be it known that I, GEORGE W. COOKE, of Orange, in the county of Essex and State of New Jersey, have invented a new and useful Improvement in Hatters' Adjustable Brim-Cutters, of which the following is the specification:

The object of the invention is to produce a cutter for trimming off the peripheries of hat-brims in either of the three following forms, viz: first, to cut the rim of the hat of uniform width all around the hat; secondly, to cut the brim wider at the sides than on the front or back; and, thirdly, to cut the rim wider at the front and back than on the sides.

The invention consists in the construction of a stock, to which the operative parts are attached; a sliding spindle having its bearings in the said stock, and carrying a rotary cutter on its front end, gage-marks being placed on the stock to set the cutter by in its different positions, to cut rims of various widths; and an arrangement of levers and springs to adjust the cutter relatively to the hat-block, so as to cut the rim in the conformation desired, as will be hereinafter more fully explained. A hand-piece, suitably prepared for the convenience of the operator, is attached to the upper side of the stock.

The invention will be readily understood by reference to the accompanying drawings, of which—

Figure I is a side elevation of the machine. Fig. II is a sectional plan of the improved cutter, the hand-piece being removed, so as to disclose the operative parts. Fig. III is a bottom plan of the machine.

The stock A, which carries the operative parts of the machine, may be made of wood or metal, as desired; and the hand-piece B will be firmly secured to it, and will be fashioned so as to be easily grasped by the hand of the operator, who will seize this hand-piece, and firmly press the machine against the hat-block and down upon the rim, and then revolve the machine around the hat-block, during which operation the rim will be cut as desired.

The stock A has a longitudinal seat nearly its entire length, and co-axial with it, for the reception of the spindle C, which is permitted a longitudinally-sliding motion within its bearings thus provided. On the forward end of the said spindle is a small arbor, $c$, which carries a rotary cutter, D, which, having its bearing on the arbor $c$, is rotated by pressing it down upon the hat-rim, (which, during the operation, is to lie flat on the hat-block,) and revolving the machine around the hat-block, as above described. A central slot, $c'$, in the spindle accommodates the stud E for a longitudinal adjustment, and the thumb-screw nut $e$, on the top of the said stud, is arranged to be set down upon the spindle, at any desired place, to adjust the position of the cutter relatively from the front end of the machine, so as to govern the width of rim to be cut, as desired. The bottom part of the stock carries a gage, $a$, arranged by the side of the cutter, so as to readily indicate the distance between the cutter and the end of the machine, for the convenience of the operator in setting the machine. Two bent levers, F, cross each other in the front end of the machine, and are attached, by a common pivot-pin, $a'$, to the stock A. The front ends $f$ of these levers extend two or three inches, more or less, beyond the front end of the stock, as shown in the drawings, and diverge from each other, as shown in Figs. II and III, and in use the machine is placed against the hat-block, with one of these lever ends on either side of it. The rear ends $f'$ of these levers are curved around by the sides of the stock, and each of them has, at or near its end, a pivot-pin, G. These pivot-pins have each a thumb-nut, $g$, for tightening the pivot-pin upon the lever, as will be required in the different adjustments of the machine. The upper end of each of these pivot-pins terminates in a spool, $g'$, against which the free ends of the springs H rest, the forward ends of the springs being fastened to the stock. The action of these springs is to habitually press the pins G and the parts attached to them toward the center of the machine. Links I have their rear ends assembled upon, and pivoted to, the top end of the stud E, while their forward ends have slots $i$, which receive the pivot-pins G.

When assembled the top faces of the links I lie against the bottom faces of the lever-arms $f'$, as shown in Fig. I, and small washers $g^2$ are interposed between the links and the screw-nuts $g$. When these nuts are set up tightly against the said washers the lever-arms $f'$ and the links I are coupled together on the pins G, as on a fixed pivot-pin; but when the nuts $g$ are left loose on their washers, the pins G may be moved by the lever-arms $f'$ without imparting a longitudinal motion to the links, as the slots I will permit a longitudinal play to the pins G in the ends of the said links.

When the screw-nuts are set up tightly to the washers $g^2$, and the front ends of the levers F are pressed apart, the links I, following the motions of their leading pins G, will carry the stud E forward with them, and if the said stud is connected by its set-screw $e$ with the spindle C, it will also be given a corresponding longitudinal motion, but if the nuts $g$ are left loose the motions of the levers F will be independent of a longitudinal motion of the links and their attachments, as the slots $i$ will permit the free play of the pins G, as described.

An elongated washer, E', as shown in Fig. III, is placed upon the stud E and interposed between the thumb-nut $e$ and the spindle C. The width of this washer is such as to permit its accommodation easily within the slot in the bottom part of A, that forms a part of the opening for the spindle-seat. When this washer is placed in the position shown by the dotted lines in Fig. III, and the nut E is screwed tightly down upon it, the stud E will be firmly attached to the spindle, and the motion of the levers already described will be imparted by the spindle; but when the washer E' is turned around in the position shown in the full lines in Fig. III, and the nut $e$ is screwed tightly down upon it, the spindle will be fixed to the stock and its longitudinal motion prohibited.

The arrangement of the parts is such that the bottom face of the stock is in plane below the bottom side of the spindle, so as to afford a clearance between the washer E' and the spindle when the washer is turned around in its transverse position.

The operation of the machine is as follows: First, to cut a rim of uniform width, loosen the screws $g$, and turn the washer E' around, so as to cause it to bear on the stock; then set the cutter for the required width of rim by the gage $a$, and tighten the nut $e$, so as to fix the position of the spindle and its cutter; then press the front end of the machine tightly against the side of the hat-block and the cutter down upon the rim, and carry the machine in this position around the hat, and the operation will be performed. Secondly, to cut a rim wider at the sides than at the front and rear, leave the spindle fixed in the stock, as before, and adjust the position of the cutter, as described, with reference to the width of rim at front or back; then fix tightly the set-screws $g$, so as to hold the front ends of the levers rigidly in position; then carry the machine around the hat, as before, and, when the arms $f$ of the levers bear against the wide parts at the sides of the block, they will carry the machine gradually from the block, so as to give the required formation to the rim. Thirdly, to cut the rim wider at the front and rear than at the sides, first turn the washer E' around, as in full lines in Fig. III, and adjust the position of the cutter, as before, with reference to the front and rear; then tighten the nut $e$, so that the spindle will follow the motions of the stud E, and also tighten the nuts $g$, so as to require the links $i$ and their attachments to follow the motions of the levers F; then, in turning the machine around the hat-block, the lever-arms $f$, when they pass the flatter part of the block at its sides, will cause the ends of the levers to diverge from each other, and this motion, communicated to the spindle and its cutter through the medium of the links I and the stud E, will move the cutters toward the hat at its sides, and so perform the operation of the springs H, act upon the lever-pins G, and, through them, upon the other parts, to keep the lever arms $f$ always upon the hat-block, so as to produce the desired effect.

Having thus described my invention, I desire to claim—

The spindle C, with slot $c'$, in combination with the levers F, links I, spring H, set-screw pins G, and stock A, substantially as described, and for the purpose set forth.

This specification signed this 25th day of May, 1875.

G. W. COOKE.

Witnesses:
 ANTON C. CRONDAL,
 RICHD. GERNER.